United States Patent
Rolph et al.

(10) Patent No.: US 10,371,554 B2
(45) Date of Patent: Aug. 6, 2019

(54) CORIOLIS MASS FLOWMETER AND METHOD FOR OPERATING A CORIOLIS MASS FLOWMETER

(71) Applicant: KROHNE AG, Basel (CH)

(72) Inventors: Christopher Rolph, Hartwell (GB); Trevor Fawcett, Guisborough (GB)

(73) Assignee: KROHNE AG, Basel (CH)

( * ) Notice: Subject to any disclaimer, the term of this patent is extended or adjusted under 35 U.S.C. 154(b) by 0 days.

(21) Appl. No.: 15/713,866

(22) Filed: Sep. 25, 2017

(65) Prior Publication Data

US 2018/0087946 A1 Mar. 29, 2018

(30) Foreign Application Priority Data

Sep. 23, 2016 (DE) ........................ 10 2016 118 016

(51) Int. Cl.
*G01F 1/84* (2006.01)
*G01F 5/00* (2006.01)

(52) U.S. Cl.
CPC .......... *G01F 1/8495* (2013.01); *G01F 1/8409* (2013.01); *G01F 1/8413* (2013.01); *G01F 1/8477* (2013.01); *G01F 5/00* (2013.01)

(58) Field of Classification Search
CPC ....................................................... G01F 1/84
See application file for complete search history.

(56) References Cited

U.S. PATENT DOCUMENTS

| | | | |
|---|---|---|---|
| 5,297,426 A | 3/1994 | Kane et al. | |
| 8,590,400 B2 | 11/2013 | Keita et al. | |
| 9,080,908 B2 | 7/2015 | Yoder | |
| 9,097,570 B2 * | 8/2015 | Rieder | G01F 1/8404 |
| 2018/0094957 A1 * | 4/2018 | Blackmore | G01F 1/8413 |

FOREIGN PATENT DOCUMENTS

DE    20 2014 102 258 U1    8/2014

* cited by examiner

*Primary Examiner* — Jewel V Dowtin
(74) *Attorney, Agent, or Firm* — David S. Safran; Roberts Mlotkowski Safran Cole & Calderon, P.C.

(57) ABSTRACT

A Coriolis mass flowmeter with a flange connection for connection to an external pipeline, with at least one oscillation generator, with at least two oscillation sensors, with at least two measuring tubes, with at least one flow divider, wherein the flow divider is arranged upstream of the at least two measuring tubes in the direction of flow, and with at least one flow collector, wherein the flow collector is arranged downstream of the at least two measuring tubes. The Coriolis mass flowmeter has at least an active measuring tube and at least a passive measuring tube being provided, the at least one active measuring tube and the at least one passive measuring tube are designed and arranged separately from one another and the at least one oscillation generator and the at least two oscillation sensors are arranged on the at least one active measuring tube.

11 Claims, 9 Drawing Sheets

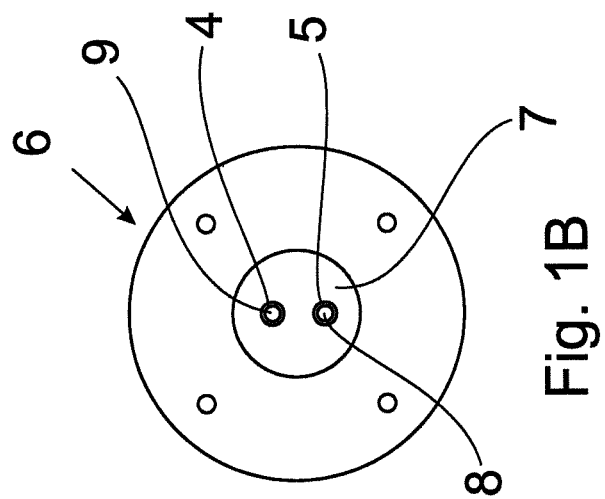
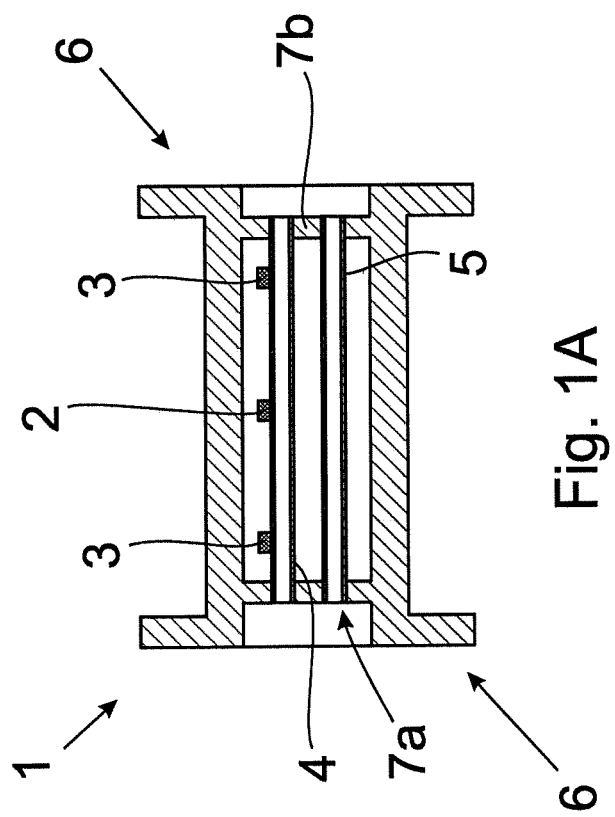
Fig. 1A
Fig. 1B

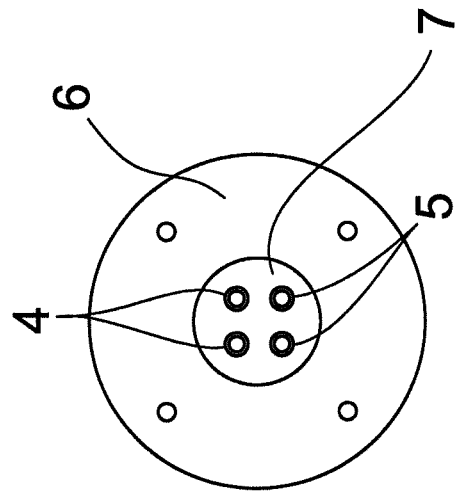
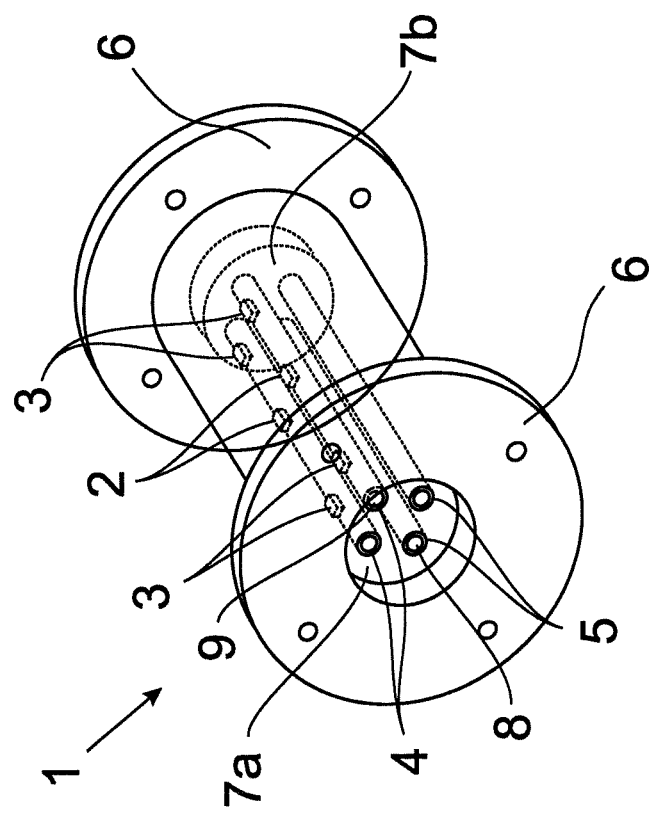
Fig. 2B
Fig. 2A

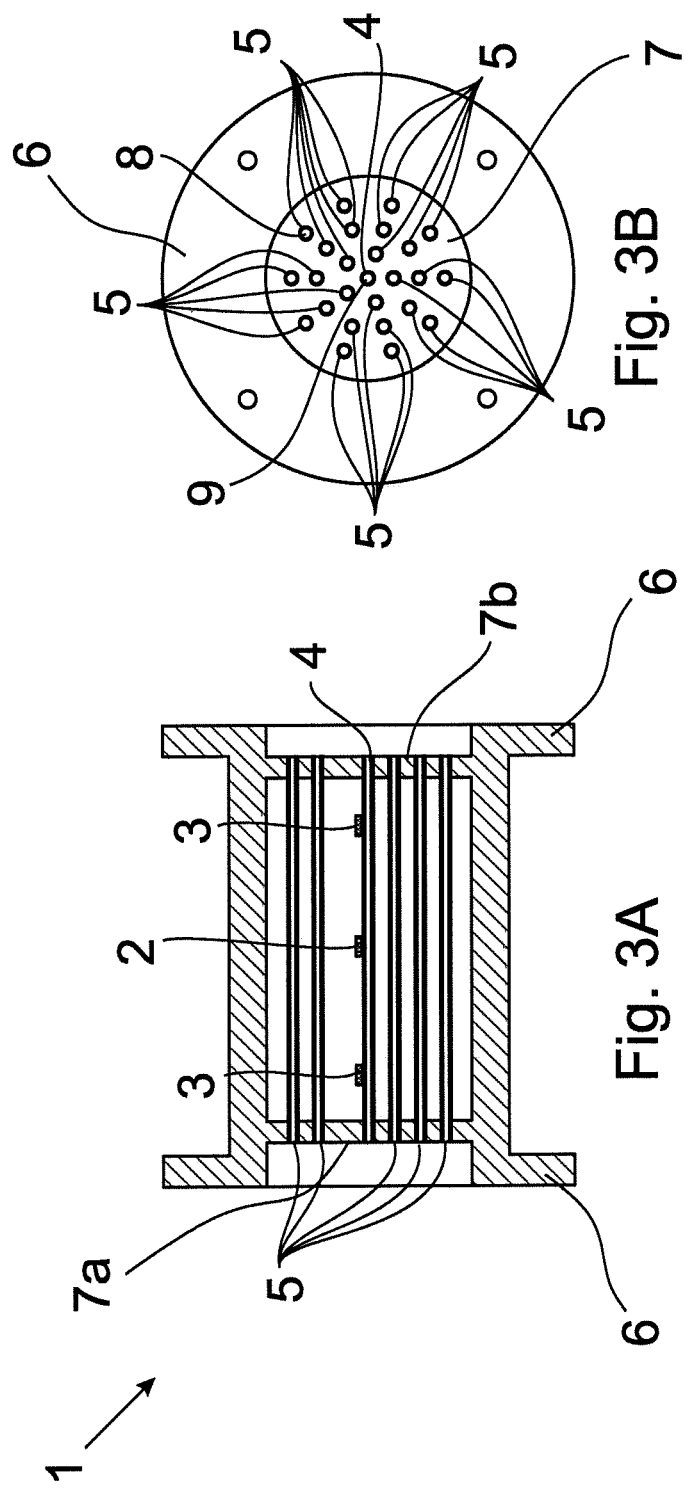

CORIOLIS MASS FLOWMETER AND METHOD FOR OPERATING A CORIOLIS MASS FLOWMETER

BACKGROUND OF THE INVENTION

Field of the Invention

The invention is based on a Coriolis mass flowmeter with a flange connection for connection to an external pipeline, with at least one oscillation generator, with at least two oscillation sensors, with at least two measuring tubes, with at least one flow divider, wherein the flow divider is arranged upstream of the at least two measuring tubes, and with at least one flow collector, wherein the flow collector is arranged downstream of the at least two measuring tubes. In addition, the invention is based on a method for operating a Coriolis mass flowmeter, wherein the Coriolis mass flowmeter has at least two measuring tubes and at least one flow divider, wherein the flow divider is arranged upstream of the at least two measuring tubes.

Description of Related Art

It is known from the prior art to determine the mass flow of a fluid through a pipeline by utilizing the Coriolis effect. For this, the measuring tube through which the fluid flows is caused to oscillate by an oscillation generator. The oscillation of the measuring tube is detected on the inlet and outlet sides, in terms of flow direction, by means of an oscillation sensor attached to the measuring tube. The Coriolis effect now causes the fluid to be delayed on the inlet side, so that a phase difference between the inlet and outlet side oscillations of the measuring tube can be measured. This phase difference is proportional to the mass flow of the fluid.

Coriolis mass flowmeters are known in different configurations. In addition to the use of a single straight measuring tube, embodiments are also known based on a double-tube arrangement or using one or more curved measuring tubes.

Special applications of the flow measurement often place high demands on the flowmeters. Measuring devices that provide high capacitance and/or operate under high pressure and/or at high temperatures generally require more effort for installation, in particular due to the large length of the measuring tubes.

A Coriolis flowmeter is known from German Application DE 10 2008 002 217 A1 and corresponding U.S. Pat. No. 8,590,400 B2, wherein the measuring tube is divided into two partial measuring tubes by a separation unit, wherein the flow is measured by both partial measuring tubes. This has the advantage that a pressure drop during the transition from the pipe to the measuring tube can also be substantially avoided even in the case of a connection to pipelines with a large diameter since the cross section of the pipeline is maintained.

A Coriolis flowmeter is known from U.S. Pat. No. 9,080,908 B2 for connection to an external large-diameter pipeline, wherein the diameter of the measuring tube corresponds to the diameter of the external pipeline, and wherein a further measuring tube with a smaller diameter is arranged within the measuring tube. The flow measurement is performed only on the inner measuring tube. The overall flow of the fluid flowing through the flowmeter is determined with the help of a conversion parameter. A disadvantage of this embodiment is that the flow through the outer measuring tube is disturbed due to the mechanical oscillations of the inner tube.

SUMMARY OF THE INVENTION

Based on this prior art, the object of the present invention is to provide a Coriolis mass flowmeter that has a particularly low installation effort and a particularly low installation length. Furthermore, an object of the invention is to provide a method for operating a Coriolis mass flowmeter, wherein the flow rate in pipelines with a large diameter can be determined particularly easily.

According to a first teaching of the present invention, the above object is achieved by a Coriolis mass flowmeter as mentioned in the introduction in that at least an active measuring tube and at least a passive measuring tube are provided, wherein the at least one active measuring tube and the at least one passive measuring tube are designed and arranged separately from one another and that the at least one oscillation generator and the at least two oscillation sensors are arranged on the at least one active measuring tube.

According to the invention, it has been recognized that the installation length and thus the installation effort can be minimized or simplified in that the Coriolis mass flowmeter is designed in such a manner that the fluid to be measured within the flowmeter is divided into at least two independent partial flows, wherein the flow is determined using one or even several partial flows. This has the advantage that flow measurement can be carried out on a measuring tube with a small diameter and a short tube length. In particular, when the external pipeline has a large diameter, the overall length of the entire flowmeter can thereby be considerably reduced. In addition, the individual partial flows do not influence each other due to the separate design of the active and passive measuring tubes.

According to the invention, at least one active measuring tube and at least one passive measuring tube are provided, wherein flow measurement is carried out in the region of the at least one active measuring tube. If several active measuring tubes are present, flow measurement is carried out on each active measuring tube. Accordingly, the Coriolis mass flowmeter comprises at least one oscillation generator and at least two oscillation sensors for each active measuring tube. The flow through the at least one passive measuring tube is not measured. If the geometry of the active and passive measuring tubes is known, the overall flow through the Coriolis mass flowmeter can be determined by means of a conversion factor. The conversion factor takes, in particular, the geometries of the at least one active measuring tube and the at least one passive measuring tube into account.

When discussing a Coriolis mass flowmeter here, an integral Coriolis mass flowmeter is what is meant, which extends completely between its external connections, i.e., between the two parts of the flange connection which are always required, namely the inflow side flange and the outflow flange. Such a Coriolis mass flowmeter is thus constructed, in order in the flow direction, with the inflow-side flange, flow dividers, active and passive measuring tubes, flow collectors, outflow-side flange. The flow divider and the flow collector are the starting and end points of the active and passive measuring tubes, i.e., of all the measuring tubes, in particular no flow dividers or flow collectors are connected in series. The Coriolis mass flowmeters considered here therefore do not include flow constructions in which integral Coriolis mass flowmeters have external flow dividers and corresponding external pipe constructions flowing around them in parallel.

According to a first design, the at least one active measuring tube and the at least one passive measuring tube have the same length. The conversion from the measured partial flow rate to the overall flow through the Coriolis mass flowmeter is particularly simple according to this design. If more than one active measuring tube and/or more than one passive measuring tube are present, it is advantageous when all active and passive measuring tubes have the same length.

In addition, it is advantageous when the number of active measuring tubes corresponds to the number of passive measuring tubes.

According to an alternative design, more passive than active measuring tubes are present, for example, the number of passive measuring tubes corresponds to an integer multiple of the number of active measuring tubes.

Alternatively, there may also be more active measuring tubes than passive measuring tubes. More preferably, the number of active measuring tubes corresponds to an integer multiple of the number of passive measuring tubes.

Typically, advantageous designs have two active measuring tubes, in particular identically designed active measuring tubes, so that, in the case of excitation of the active measuring tubes that is out of phase, the center of gravity of the Coriolis mass flowmeter is maintained.

The aforementioned designs with regard to the number of active and passive measuring tubes have the advantage that a conversion from the measured partial flow rate to the overall flow through the Coriolis mass flowmeter is particularly simple.

A particularly simple conversion to the overall flow rate is also possible when the at least one active measuring tube and the at least one passive measuring tube have the same diameter. If, according to this design, more than one active measuring tube and/or more than one passive measuring tube are present, all active and passive measuring tubes have the same diameter. In particular, when the active measuring tubes and the passive measuring tubes simultaneously have the same length, the conversion from the partial flow to the overall flow is particularly simple.

According to a further advantageous design, the at least one active measuring tube and the at least one passive measuring tube each have a cross section surface, wherein the cross section surface of the at least one active measuring tube is identical to the cross section surface of the at least one passive measuring tube. If more than one active measuring tube and/or more than one passive measuring tube are present, preferably the cross-sectional surface areas of all passive and active measuring tubes are identical.

If it is said that the cross-sectional surface areas are identical, it is meant that both the shape as well as the size, i.e., the surface area, of the cross-sectional surface areas are identical.

Alternatively, the shape of the cross section surface of the at least one active measuring tube may differ from the shape of the cross section surface of the at least one passive measuring tube. At the same time, the size, i.e., the surface area, of the cross section surface of the at least one active measuring tube can be identical to or different than the size of the cross section surface of the at least one passive measuring tube.

It is also conceivable that the shape of the cross section surface of the at least one active measuring tube is identical to the shape of the cross section surface of the at least one passive measuring tube, wherein, however, the size of the cross section surface of the at least one active measuring tube is different than the size of the cross section surface of the at least one passive measuring tube.

According to a further design, at least one active measuring tube and at least two passive measuring tubes are provided, wherein each active measuring tube and each passive measuring tube have a cross section surface, wherein the sum of the cross-sectional surface areas of the active measuring tube or tubes defines a first overall cross section and wherein the sum of the cross-sectional surface areas of the passive measuring tubes defines a second overall cross section, wherein the second overall cross section corresponds to an integer multiple of the first overall cross section.

In principle, the cross section surface of the at least one active measuring tube and/or the cross section surface of the at least one passive measuring tube can be circular or oval or triangular or rectangular or it can have the shape of a circular sector or a circular segment.

According to a further design, the at least one active measuring tube and the at least one passive measuring tube are straight or bent, preferably bent in a U-shape. Thereby, the at least one active measuring tube and the at least one passive measuring tube can have the same outer shape, the at least one active measuring tube and the at least one passive measuring tube can alternatively also have different shapes.

Particularly preferably, the at least one active measuring tube is bent, preferably bent into a U-shape, and the at least one passive measuring tube is designed straight.

According to a further design, the at least one active measuring tube forms a measuring tube arrangement. This measuring tube arrangement can, for example, comprise a straight active measuring tube or a straight double-tube arrangement or, preferably, a bent-shaped measuring tube or a double-tube arrangement which is preferably bent in a U-shape. The Coriolis mass flowmeter may have one or more of the aforementioned measuring tube arrangements.

In a further design, at least two passive measuring tubes and at least one flow merger are provided, wherein at least two passive measuring tubes are combined by the flow merger into a passive measuring tube. This has the advantage that unfavorable speed profiles can be compensated for.

Particularly preferably, the Coriolis mass flowmeter is designed such that it is suitable for carrying out the following method steps:

Detecting the partial flow in the at least one active measuring tube and

Determining the overall flow through the flowmeter by means of a conversion factor.

According to a second teaching of the present invention, the object set forth in the introduction is achieved by a method mentioned in the introduction in that the fluid to be measured is divided by the flow divider into the at least two measuring tubes, that the partial mass flow is measured in at least one measuring tube, and that the overall mass flow through the Coriolis mass flowmeter is determined from the measured partial mass flow with the help of a conversion factor.

According to a first implementation of the method according to the invention, the conversion factor takes into account the geometries of the at least two measuring tubes.

In detail, there is a plurality of possibilities for designing and further developing the Coriolis mass flowmeter according to the invention and the method according to the invention. Reference is made to both the patent claims subordinate to the independent patent claims as well as to the following description of preferred embodiments in conjunction with the drawing. The drawing shows

BRIEF DESCRIPTION OF THE DRAWINGS

FIGS. 1A & 1B show a first embodiment of a Coriolis mass flowmeter according to the invention,
FIGS. 2A & 2B show a second embodiment of a Coriolis mass flowmeter according to the invention,
FIGS. 3A & 3B show a third embodiment of a Coriolis mass flowmeter according to the invention.

DETAILED DESCRIPTION OF THE INVENTION

Figure 4:
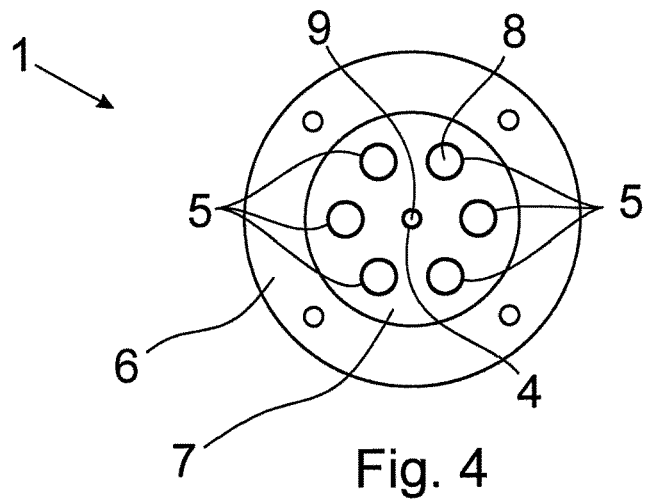
FIG. 4 shows a fourth embodiment of a Coriolis mass flowmeter according to the invention in a side view.

FIGS. 1A & 1b show a first embodiment of a Coriolis mass flowmeter 1 according to the invention. FIG. 1A shows the flowmeter 1 in a sectional view. The illustrated Coriolis mass flowmeter has a flange connection 6 for connection to an external pipeline (not shown), an oscillation generator 2 and two oscillation sensors 3. In addition, the Coriolis mass flowmeter 1 has an active measuring tube 4 with a cross section surface area 9 and a passive measuring tube 5 with a cross-sectional surface area 8, wherein the oscillation generator 2 and the oscillation sensors 3 are arranged on the active measuring tube 4. In the embodiment shown, the active measuring tube 4 and the passive measuring tube 5 have identical cross-sectional surface areas 8, 9 and are of the same length. The connection to an external pipeline (not shown) takes place via a flange connection 6 consisting of an inflow-side flange 6 and an outflow-side flange 6. In addition, a flow divider 7a is provided at the inlet side which, during operation, directs the fluid to the two measuring tubes 4 and 5 in equal portions. In addition, a flow collector 7b is present on the outflow side which, during operation, recombines the fluid flows from the active measuring tube 4 and the passive measuring tube 5. During operation, only the flow that flows through the active measuring tube 4 is measured. The overall flow that flows through both measuring tubes can then be determined with the help of a conversion factor. In the present embodiment, the conversion factor has the value 2.

FIG. 1B shows the illustrated embodiment in a side view. The illustration shows the outflow-side flange connection 6 as well as the measuring tubes 4 and 5, which are designed and arranged separately from one another.

All of the Coriolis mass flowmeters 1 shown in the figures have in common that they are integral Coriolis mass flowmeters 1, which thus extend completely between their external connections, i.e., between the two parts of the flange connection 6 which are always required, namely the inflow-side flange 6 and the outflow-side flange 6. Such Coriolis mass flowmeters are thus constructed, in order in the flow direction, with the inflow-side flange 6, flow dividers 7a, active and passive measuring tubes 4, 5, flow collectors 7b, outflow-side flange 6. The flow divider 7a and the flow collector 7b are the starting and end points of the active and passive measuring tubes 4, 5, i.e., of all measuring tubes 4, 5.

FIGS. 2A & 2B show a second embodiment of a Coriolis mass flowmeter 1 with two active measuring tubes 4 according to the invention and two passive measuring tubes 5. As shown in FIG. 2A, the Coriolis mass flowmeter 1 has an oscillation generator 2 and two oscillation sensors 3 on each active measuring tube 4. The measuring tube arrangement of the active measuring tubes 4 is a double-tube arrangement for detecting the flow. That means, during operation, the active measuring tubes 4 are excited to oscillation in opposite directions. Also in this embodiment, the active measuring tubes 4 and the passive measuring tubes 5 have identical cross-sectional surface areas 8, 9 and the same length. During operation, the flow through the active measuring tubes 4 is measured. The conversion factor here also has the value 2.

FIG. 2B shows the illustrated embodiment in the side view. The illustration shows the arrangement of the active measuring tubes 4 and the passive measuring tubes 5.

FIGS. 3A & 3B show a third embodiment of a Coriolis mass flowmeter 1 according to the invention. FIG. 3A shows the embodiment in a sectional view. In the embodiment shown, an active measuring tube 4 is surrounded by a plurality of passive measuring tubes 5, wherein the cross-sectional surface area 9 of the active measuring tube 4 is identical to the cross-sectional surface areas 8 of the passive measuring tubes 5. FIG. 3B shows the embodiment in the side view. It can be seen from the illustration that 25 passive measuring tubes 5 are provided, which are arranged around the active measuring tube 4. Due to the identical geometric configuration of the active measuring tube 4 with the passive measuring tubes 5, the conversion factor 25 is used for the calculation of the overall flow.

FIG. 4 shows a side view of a further, fourth embodiment of a Coriolis mass flowmeter 1. The embodiment shown has an active measuring tube 4 and six passive measuring tubes 5. In this case, the cross-sectional surface areas 8 of the passive measuring tubes 5 are larger, in detail by the factor 4, than the cross-sectional surface area 9 of the active measuring tube 4.

Figure 5:
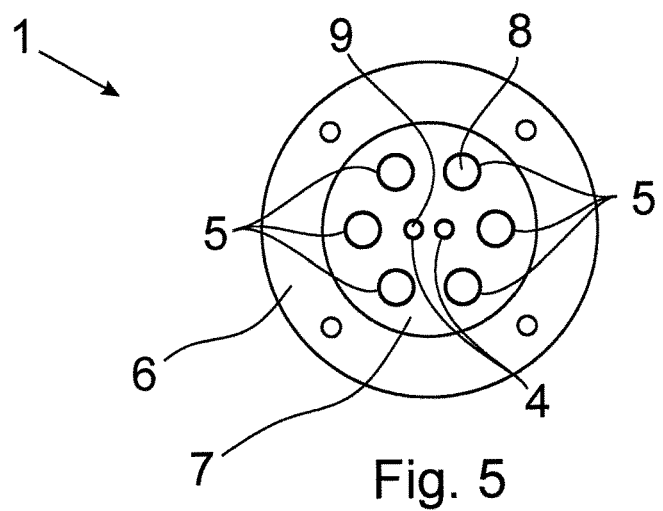
FIG. 5 shows a fifth embodiment of a Coriolis mass flowmeter according to the invention in a side view,
FIG. 6 show a sixth embodiment of a Coriolis mass flowmeter according to the invention in a side view.

FIG. 5 shows a side view of a fifth embodiment of a Coriolis mass flowmeter 1. The embodiment shown has two active measuring tubes 4 and six passive measuring tubes 5. The measuring tube arrangement of the active measuring tubes 4 is a double-tube arrangement. The cross-sectional surface areas 8 of the passive measuring tubes 5 are greater by a factor of 4 than the cross-sectional surface area 9 of the active measuring tubes 4.

Figure 6:
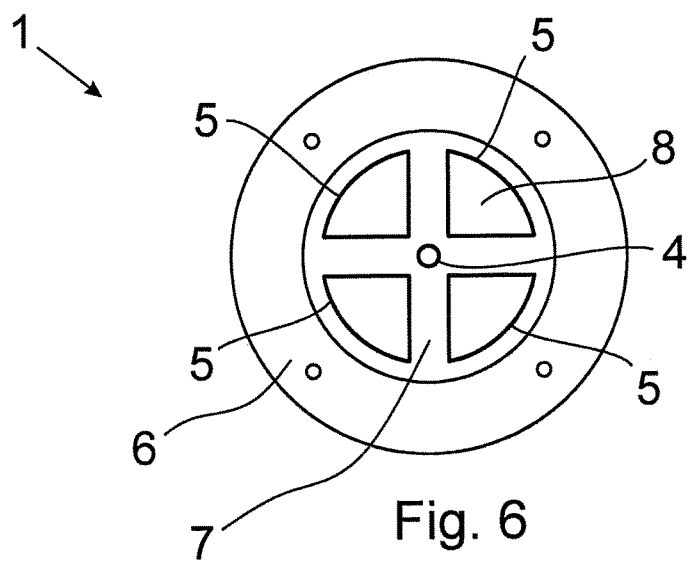

FIG. 6 shows a side view of a sixth embodiment of a Coriolis mass flowmeter 1. In the embodiment shown, an active measuring tube 4 is present, which is surrounded by four passive measuring tubes 5. In contrast to the previously illustrated embodiments, the shape of the cross section of the passive measuring tubes 5 is not circular, but instead the cross-sectional surface area 8 is in the form of a quadrant.

Figure 7:
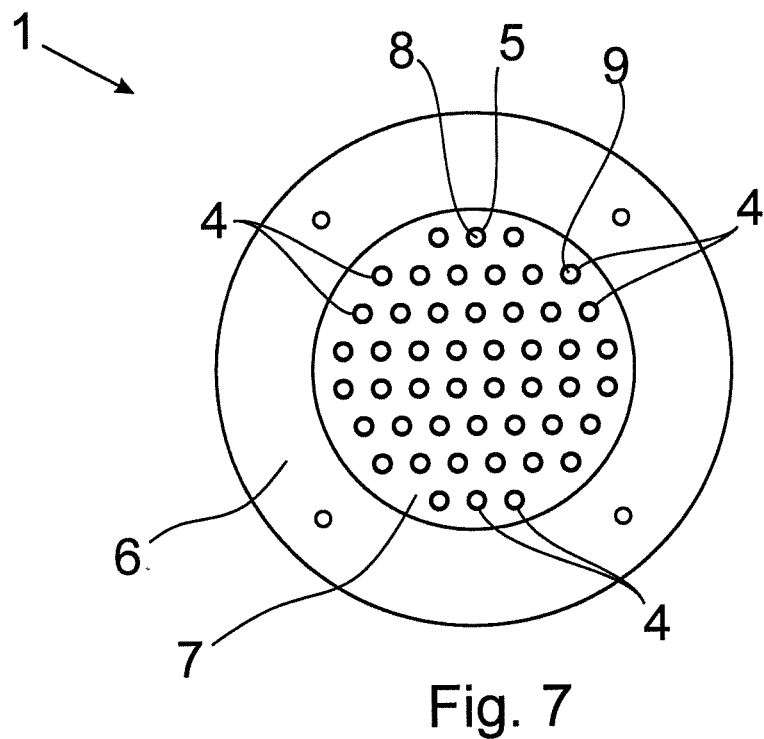
FIG. 7 shows a seventh embodiment of a Coriolis mass flowmeter according to the invention in a side view.

FIG. 7 shows a side view of a seventh embodiment of a Coriolis mass flowmeter 1. The illustrated Coriolis mass flow meter 1 has six active measuring tubes 4 in three double tube arrangements and 42 passive measuring tubes 5. The cross-sectional surface areas 8 of the passive measuring tubes 5 are identical to the cross-sectional surface areas 9 of the active measuring tubes 4. The sum of the individual cross-sectional surface areas 9 of the active measuring tubes 4 defines a first overall cross section and the sum of the cross-sectional surface areas 8 of the passive measuring tubes 5 define a second overall cross section. In the embodiment shown, the second overall cross section is greater than the first overall cross section by an integer multiple, namely by a factor of 7. Consequently, the conversion factor for the calculation of the overall flow in the present case has the value 7.

Figure 8:
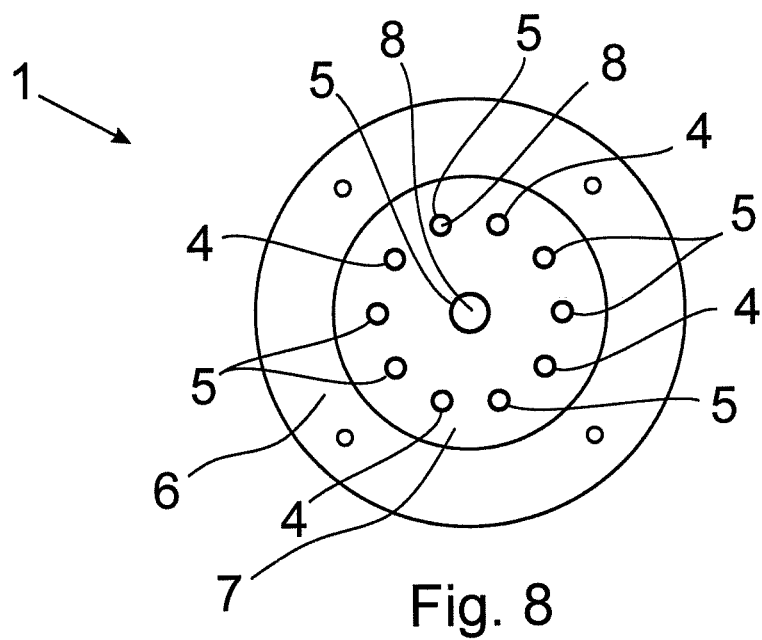
FIG. 8 shows an eighth embodiment of a Coriolis mass flowmeter according to the invention in a side view.

FIG. 8 shows an eighth embodiment of a Coriolis mass flowmeter 1 in a side view. The flowmeter 1 has four active measuring tubes 4 and seven passive measuring tubes 5. In contrast to the embodiments shown so far, the passive measuring tubes 5 do not all have the same size cross-sectional surface area 8. One passive measuring tube 5, which has a larger diameter than the remaining active measuring tubes 4 and passive measuring tubes 5, is arranged centrally in the flowmeter 1. In the embodiment shown, the cross-sectional surface areas 8 of the remaining passive measuring tubes 5 are identical to the cross-sectional surface areas 9 of the active measuring tubes 4. The cross-sectional surface area 8 of the central passive measuring tube 5 is larger by an integer multiple than the cross sectional surfaces 8 of the remaining passive measuring tubes 5.

Figure 9:
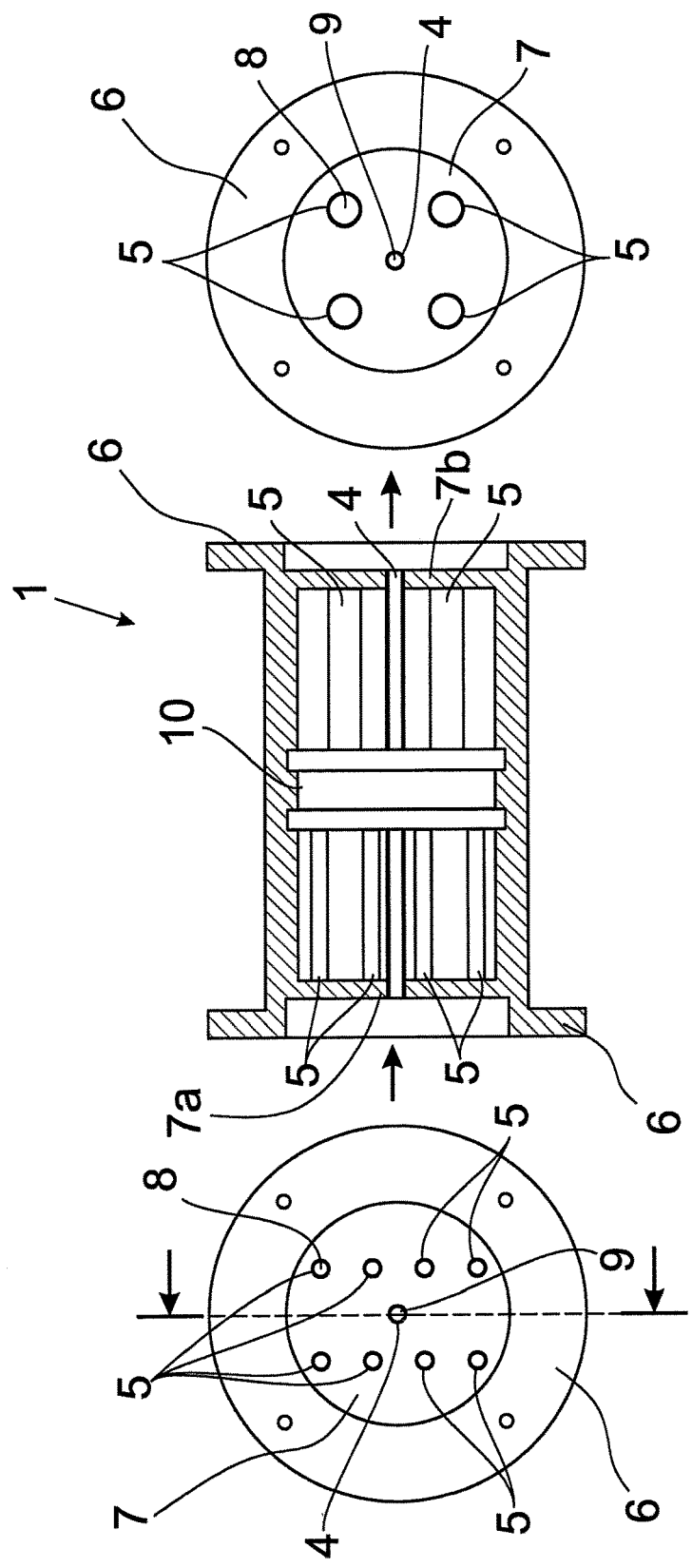
FIG. 9A-9C show a ninth embodiment of a Coriolis mass flowmeter according to the invention.

FIGS. 9A-9C show a ninth embodiment of a Coriolis mass flowmeter 1. FIG. 9B shows the flowmeter 1 in a sectional view. The arrows indicate the flow direction of the fluid. The flowmeter 1 has an active measuring tube 4 and a plurality of passive measuring tubes 5. In addition, in the middle of the flowmeter 1, there is a flow merger 10 which joins two passive measuring tubes 5 into one passive measuring tube 5.

FIG. 9A shows the inlet-side side view of the flowmeter 1. An active measuring tube 4, which is surrounded by six passive measuring tubes 5, is centrally arranged in the illustration. All active measuring tubes 4 and passive measuring tubes 5 have identical cross-sectional surface areas 8, 9. FIG. 9C shows the outflow-side side view of the flowmeter 1. In the illustration, an active measuring tube 4, which is surrounded by four passive measuring tubes 5, is centrally provided. The cross-sectional surface area 8 of each passive measuring tube 5 is twice as large as the cross-sectional surface area 9 of the active measuring tube 4.

Figure 10:
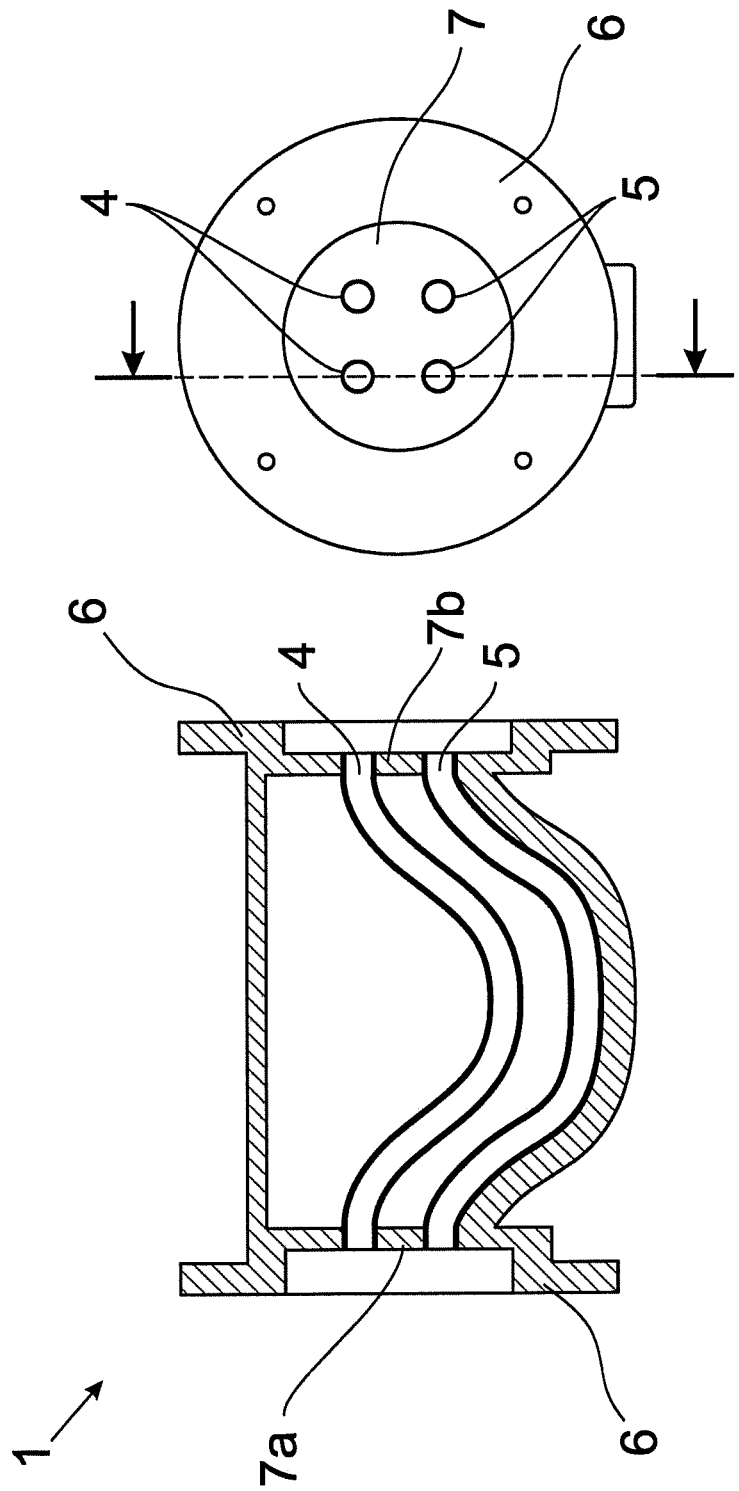
FIG. 10A-10B show a tenth embodiment of a Coriolis mass flowmeter according to the invention.

FIGS. 10A & 10B show a tenth embodiment of a Coriolis mass flowmeter 1. FIG. 10A shows a sectional representation of the flowmeter 1. The flowmeter 1 has two active measuring tubes 4 and two passive measuring tubes 5. Both the active measuring tubes 4 and the passive measuring tubes 5 are designed bent in a U-shape. FIG. 10B shows the embodiment in the side view.

Figure 11:
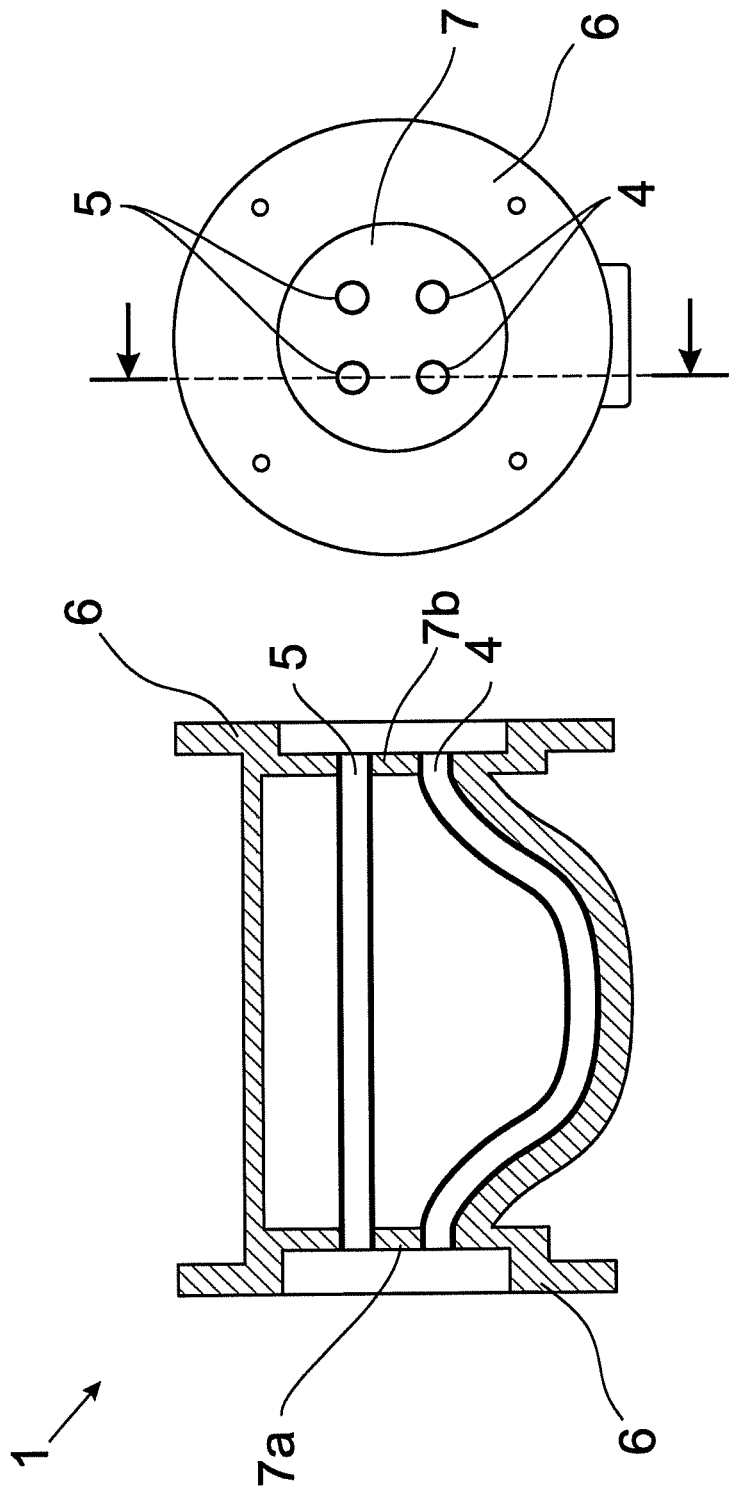
FIGS. 11A & 11B show an eleventh embodiment of a Coriolis mass flowmeter according to the invention.

FIGS. 11A & 11B show an eleventh embodiment of a Coriolis mass flowmeter 1 with two active measuring tubes 4 and two passive measuring tubes 5. The passive measuring tubes 5 are designed straight, while the active measuring tubes 4 are bent in a U-shape.

All illustrated embodiments of the Coriolis mass flowmeter 1 have the advantage that the length of the measuring tubes can be particularly short because of their small diameters. As a result, the installation effort can be significantly reduced.

Figure 12:
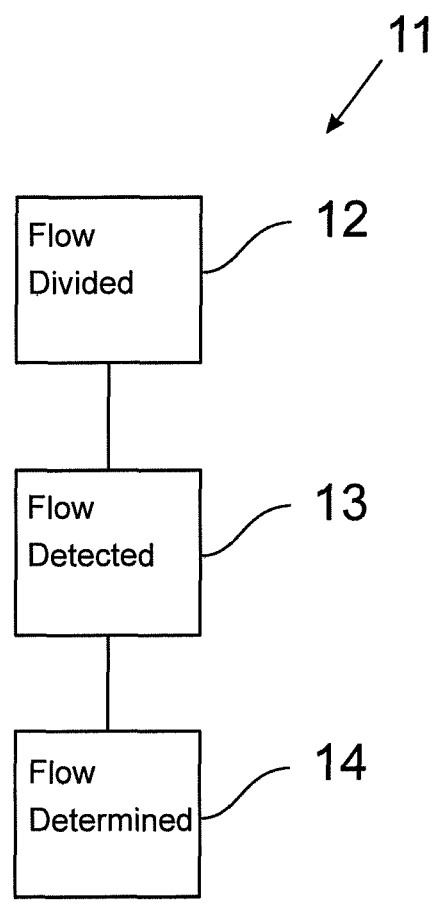
FIG. 12 is a flow chart of a first embodiment of a method according to the invention.

FIG. 12 shows a first exemplary embodiment of a method 11 according to the invention for operating a Coriolis mass flowmeter 1, wherein the Coriolis mass flowmeter 1 has at least two measuring tubes 4 and 5 and at least one flow divider 7a, wherein the flow divider 7a is arranged upstream of the at least two measuring tubes 4 and 5. In a first step 12 of the method according to the invention, the fluid to be measured is divided by the flow divider 7a into at least two partial flows flowing through the at least two measuring tubes 4 and 5. Subsequently, in a next step 13, the partial flow of the fluid, which flows through at least one measuring tube 4, is detected. Then, the overall mass flow of the fluid through the Coriolis mass flowmeter is determined with the help of a conversion factor in a next step 14 using the measured partial mass flow.

What is claimed is:

1. Coriolis mass flowmeter, comprising:
   a flange connection for connection to an external pipeline,
   at least one oscillation generator, with at least two oscillation sensors,
   at least two measuring tubes,
   at least one flow divide arranged upstream of the at least two measuring tubes in a direction of flow, and
   at least one flow collector arranged downstream of the at least two measuring tubes,
   wherein said at least two measuring tubes comprise at least an active measuring tube and at least a passive measuring tube,
   wherein the at least one active measuring tube and the at least one passive measuring tube are arranged separately from one another and
   wherein the at least one oscillation generator and the at least two oscillation sensors are arranged on the at least one active measuring tube.

2. Coriolis mass flowmeter according to claim 1, wherein the at least one active measuring tube and the at least one passive measuring tube have the same length.

3. Coriolis mass flowmeter according to claim 1, wherein the number of active measuring tubes is the same as the number of passive measuring tubes.

4. Coriolis mass flowmeter according to claim 1, wherein the number of passive measuring tubes corresponds to an integer multiple of the number of active measuring tubes.

5. Coriolis mass flowmeter according to claim 1, wherein the at least one active measuring tube and the at least one passive measuring tube each have a cross-sectional surface area, and wherein the cross-sectional surface area of the passive measuring tube is identical to a cross-sectional surface area of the at least one active measuring tube.

6. Coriolis mass flowmeter according to claim 1, wherein the at least one active measuring tube and the at least one passive measuring tube each have a cross section surface area, and wherein the cross-sectional surface area of the passive measuring tube is different from the cross-sectional surface area of the active measuring tube.

7. Coriolis mass flowmeter according to claim 1, wherein the at least one active measuring tube comprises a plurality of active measuring tubes, wherein the at least one passive measuring tube comprises a plurality of passive measuring tubes, wherein each active measuring tube and each passive measuring tube has a cross-sectional surface area, wherein the sum of the cross-sectional surface areas of the plurality of active measuring tube defines a first overall cross-sectional area and wherein the sum of the cross-sectional surface areas of the plurality of passive measuring tubes defines a second overall cross-sectional area, and wherein the second overall cross-sectional area corresponds to an integer multiple of the first overall cross-sectional area.

8. Coriolis mass flowmeter according to claim 1, wherein the at least one active measuring tube and the at least one passive measuring tube each have a cross-sectional surface area, wherein the cross-sectional surface area of at least one of the active measuring tube and the passive measuring tube is one of circular, oval, triangular, rectangular, circle segment, or circle sector shaped.

9. Coriolis mass flowmeter according to claim 1, wherein the at least one active measuring tube and the at least one passive measuring tube are curved in a U-shape.

10. Coriolis mass flowmeter according to claim 1, wherein the at least one active measuring tube is curved a U-shape, and the at least one passive measuring tube is straight.

11. Coriolis mass flowmeter according to claim 1, wherein at least two passive measuring tubes are provided and wherein at least one flow merger is provided by which the at least two passive measuring tubes are merged into one passive measuring tube.

* * * * *